US005350638A

United States Patent [19]

Sawada et al.

[11] Patent Number: 5,350,638

[45] Date of Patent: Sep. 27, 1994

[54] ELECTRICAL INSULATED WIRE

[75] Inventors: Kazuo Sawada; Shinji Inazawa; Kouichi Yamada, all of Osaka, Japan

[73] Assignee: Sumitomo Electric Industries, Ltd., Osaka, Japan

[21] Appl. No.: 811,459

[22] Filed: Dec. 19, 1991

[30] Foreign Application Priority Data

Apr. 26, 1991 [JP] Japan .................................. 3-096987

[51] Int. Cl.[5] .......................... H01B 7/00; B32B 15/04

[52] U.S. Cl. .................................... 428/623; 428/627; 428/472; 174/120 R; 174/110 R

[58] Field of Search ............... 428/671, 675, 627, 623, 428/457, 469, 472, 698; 174/110 A, 110 R, 120 R, 120 C, 126.2

[56] References Cited

U.S. PATENT DOCUMENTS

| | | | |
|---|---|---|---|
| 3,343,984 | 9/1967 | Saums et al. | 174/120 R |
| 4,431,708 | 2/1984 | Carver et al. | 428/627 |
| 4,500,383 | 2/1985 | Kashiwagi et al. | 428/630 |

FOREIGN PATENT DOCUMENTS

| | | | |
|---|---|---|---|
| 0012422 | 6/1980 | European Pat. Off. | 174/120 R |
| 0416131 | 3/1991 | European Pat. Off. . | |
| 56-08167 | 7/1981 | Japan | 428/627 |
| 3-88215 | 4/1991 | Japan . | |
| 1133333 | 11/1968 | United Kingdom | 174/110 A |
| 1433526 | 4/1976 | United Kingdom | 174/110 A |
| 2182800 | 5/1987 | United Kingdom . | |

*Primary Examiner*—Benjamin R. Fuller
*Assistant Examiner*—Valerie Ann Lund
*Attorney, Agent, or Firm*—W. G. Fasse; W. F. Fasse

[57] ABSTRACT

An electrically insulated wire which has an electrical conductor formed of a base material having an outer conductor surface and a chromium oxide containing layer formed on the outer conductor surface. An electrically insulating nitride layer is provided on the chromium oxide containing layer. The electrically insulated wire has a high insulability at high-temperatures, an excellent flexibility and does not form a gas adsorption source.

7 Claims, 2 Drawing Sheets

ELECTRICAL INSULATED WIRE

FIELD OF THE INVENTION

The present invention relates to an insulated electrical wire for use as an interconnection wire or a wire for a winding in a high vacuum apparatus or in an apparatus for a high temperature operation.

BACKGROUND INFORMATION

An insulated electrical wire may be used in equipment such as heating equipment or a fire alarm, which requires safety at a high operating temperature. Such an insulated wire is also employed in an automobile in an environment which is heated to a high temperature. An insulated wire of this type is generally formed by a conductor which is coated with heat resistant organic resin such as polyimide or fluororesin.

When an insulated wire is used where a high heat resistance or a high degree of vacuum is required, it is impossible to attain a sufficient heat resistance or non-outgassing property with only the aforementioned organic coating. In that case, therefore, an insulated wire is used that has a conductor which passes through an insulator tube of ceramics, or an MI (mineral insulated) cable comprising a conductor which passes through a tube of a heat resistant alloy, such as stainless steel alloy, filled with fine particles of a metal oxide such as magnesium oxide, or the like.

On the other hand, a glass braided tube insulated wire employing an insulating member of glass fiber fabric or the like is known as an insulated wire having a high heat resistance and flexibility.

However, an insulated wire coated with organic resin can maintain its insulability merely up to a temperature of about 200° C. at the most. Therefore, such an insulated wire cannot be used when an insulability is required under a high operating temperature of at least 200° C.

Further, the insulated wire which has an improved heat resistance due to an insulator tube of ceramics has an inferior flexibility. On the other hand, the MI cable, which is formed by a heat-resistant alloy tube and a conductor, has an increased outer diameter. Thus, the MI cable has a relatively large cross-section with respect to electric energy which is allowed by the conductor to pass through the heat-resistant alloy tube. While it is necessary to bend the heat-resistant alloy tube to a prescribed curvature in order to wind the MI cable into a coil or on a bobbin or the like, such bending required for the winding is difficult. When the MI cable is coiled, further, it is difficult to improve the winding density due to the large diameter.

When the glass braided tube insulated wire is arranged in a prescribed configuration, the glass fiber generates glass dust, which may serve as a gas adsorption source. When the glass braided tube insulated wire is employed in environment which requires a high degree of vacuum, it is impossible to maintain the high degree of vacuum due to the gas adsorption source provided by the glass dust.

SUMMARY OF THE INVENTION

The present invention has been proposed in order to solve the aforementioned problems of the conventional insulated wires. It is an object of the invention to provide an insulated wire, which has the following advantages: (a) a high insulability in a high-temperature environment; (b) an excellent flexibility; (c) no gas adsorption; and (d) freely selectable base materials and inorganic insulating materials which are applicable in various ways.

An insulated wire according to the present invention comprises a base material forming a conductor core, a chromium oxide containing layer, and a nitride insulating layer. The base material conductor has an outer surface. The chromium oxide containing layer is formed on said outer surface. The nitride insulating layer is formed on the chromium oxide containing layer. This nitride insulating layer is formed by thermal decomposition of an organic metal polymer.

According to the present invention, the chromium oxide containing layer is preferably formed by an electrochemical method such as electrolytic plating or electroless plating.

The chromium oxide containing layer serving as an underlayer for the nitride insulating layer preferably has an outermost layer which serves as an adhesion layer for the nitride insulating layer. To this end, the outermost layer is preferably made of $CrO_{3-x}$ ($1.5 \leqq x \leqq 2.5$). The outermost layer containing chromium oxide is formed by an electrochemical method and has an excellent adhesion.

According to the present invention, the nitride insulating layer preferably contains silicon nitride and/or aluminum nitride.

According to the present invention, further, the base material is preferably made of copper or copper alloy, providing a high conductivity at a low cost. For conductor wires to be used at a high operating temperature, the base material of the conductor core may be formed by a conductor which is coated with nickel, chromium, silver, iron or iron alloy such as stainless steel, or titanium or titanium alloy. In this case, a layer of such a metal or alloy can be formed on a surface of copper or copper alloy by plating or by a cladding method.

According to the present invention, a metal oxide insulating layer may be formed by a sol-gel method between the chromium oxide containing layer and the nitride insulating layer.

The sol-gel method is a method for forming a sol of a precursor for a metal oxide by hydrolyzing and dehydrating or polycondensing a hydrolyzable compound having a metal-oxygen-organic group bonding such as metal alkoxide or metal carboxylic acid ester and forming a metal oxide through a gel by appropriate heat treatment.

It is known that a chromium-plated layer is formed on a conductor of copper or copper alloy as an excellent adhesion layer. When such a chromium-plated layer is to be coated with an insulating nitride ceramic layer of silicon nitride or the like which is prepared by a heat treatment of a precursor solution for a metal oxide, however, such nitride ceramic hardly adheres to the chromium-plated layer, as we have empirically found. When an insulated wire is prepared by directly forming a thin ceramic film such as a nitride on the surface of a conductor of copper or the like, the thin ceramic film, serving as an insulating layer, adheres insufficiently to the base material.

According to the present invention, therefore, a chromium oxide containing layer is formed as an outermost layer on the outer surface of a base material conductor. A layer of insulating nitride ceramic having an excellent adhesion is provided on the outermost layer of the chromium oxide containing layer.

According to the present invention, the chromium oxide containing layer is preferably formed by an electrochemical method, as hereinabove described. When the chromium oxide containing layer is formed by electroplating, the electrolytic bath is preferably prepared by adding a small amount of organic acid to an aqueous solution of chromic acid. This electrolytic bath is different from a Sargent bath, mainly containing chromic acid and sulfuric acid, which is known as an electrolytic bath generally employed for chrome plating, as follows:

Mineral acid which is mixed into an electrolytic bath is adapted to dissolve chromium oxide formed on a plated surface by electroplating. Therefore, a glossy metal chromium layer is plated in a Sargent bath. In a chromium oxide containing layer formed according to the present invention, on the other hand, it is necessary to preferentially deposit and apply chromium oxide. According to the present invention, therefore, organic acid is employed in place of a mineral acid.

According to the present invention, the so-formed layer, which is mainly composed of chromium oxide, preferably has a rough surface, since the same is further coated with an intermediate layer such as a nitride insulating layer or a metal oxide insulating layer. In a preferred embodiment of the present invention, such preferential formation of chromium oxide and the rough surface can be attained by electro-plating at a current density which is different from that for general gloss plating. In general, gloss plating is performed at a current density of 10 to 60 $A/dm^2$, depending on the treatment temperature. In the preferred embodiment of the present invention, however, a current density of 100 to 200 $A/dm^2$ is employed to form a chromium oxide containing layer having a rough surface.

According to the present invention, the nitride insulating layer is formed by thermally decomposing an organic metal polymer. Such an organic metal polymer can be prepared of alkyl aminosilicate such as polysilazane, for example. This heat treatment is preferably performed under an atmosphere of ammonia or in a nitrogen jet. The organic metal polymer can be substantially completely decomposed into a nitride by such a heat treatment at a temperature of about 700° C.

In the insulated wire according to the present invention, the chromium oxide containing layer is formed on the outer surface of the base material core conductor, and the nitride insulating layer is formed on the chromium oxide containing layer. The chromium oxide containing layer has an excellent adhesion to the base material, as well as to a layer such as the nitride insulating layer or a metal oxide insulating layer. Therefore, a higher adhesion can be attained as compared to a case of directly forming a nitride insulating layer or a metal oxide insulating layer on the outer surface of the conductor. Thus, the insulated wire according to the present invention has a heat resistance and insulability, as an well as excellent flexibility.

The nitride insulating layer formed on the chromium oxide containing layer has a smooth outer surface. Thus, it is possible to obtain a high breakdown voltage which is proportionate to the film thickness and to reduce a gas adsorption whereby the present insulated wire provides a high degree of vacuum in a high vacuum apparatus.

In the insulated wire according to the present invention, the nitride insulating layer is formed on the chromium oxide containing layer. Since any type of nitride insulating layer can be formed on the chromium oxide containing layer with an excellent adhesion, it is possible to apply a nitride insulating layer which is suitably applied in various ways.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

EXAMPLE 1

Figure 1:
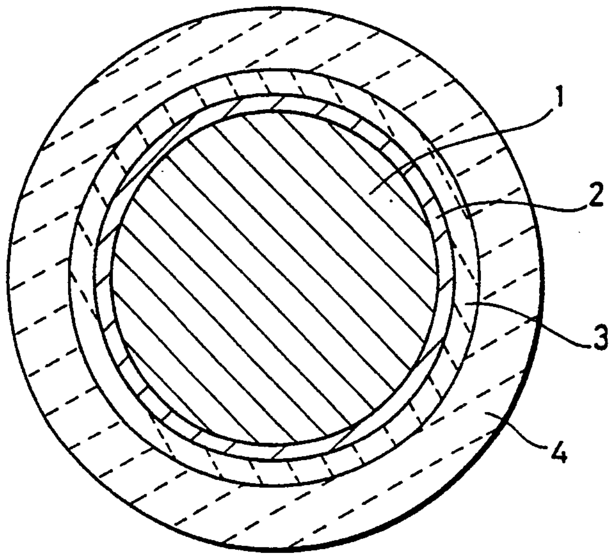
FIG. 1 is a sectional view showing Example 1 of the present invention.

(a) Formation of a Chromium Oxide Containing Layer

Electrolytic plating was performed on the outer surface of a nickel-plated copper wire of 1.8 mm in wire diameter. The electrolyte was contained 200 g/l of chromic anhydride and 20 g/l of acetic acid. The plating conditions were as follows: the base material was used as a cathode at a bath temperature of 50° C. with a current density of 150 $A/dm^2$ and a treatment time of 2 minutes. Thus, a chromium oxide containing layer was formed on the outer surface of the nickel-plated copper wire with a thickness of about 1 $\mu m$.

(b) Preparation of Coating Solution 15 ml of dichlorosilane and 40 ml of triethylamine were heated in an autoclave for 5 hours, to prepare polysilazane. The as-obtained polysilazane was diluted with 100 ml of tetrahydrofuran, to prepare a coating solution.

(c) Coating

The wire obtained in the above process (a) was dipped in the coating solution obtained in the process (b). The coated wire was heated in a nitrogen atmosphere at a temperature of 700° C. for 10 minutes. The steps of dipping the wire in the coating solution and heating the same were repeated 10 times.

Thus, an organic metal polymer was applied onto a chromium oxide containing layer and heated to prepare a nitride insulating layer. FIG. 1 shows the resulting insulated wire. Referring to FIG. 1, a nickel-plated layer 2 is formed on the outer surface of a copper wire 1. A chromium oxide containing layer 3 is formed on the nickel-plated layer 2. A nitride insulating layer 4 produced by heat treating a precursor for a metal nitride, is provided on the chromium oxide containing layer 3. In this Example, the nitride insulating layer 4 was made of silicon nitride. Further, a layer defined by the chromium oxide containing layer 3 and the nitride insulating layer 4 was about 5 $\mu m$ in thickness.

In order to evaluate the insulability of the so produced insulated wire, the breakdown voltage was measured. The breakdown voltage of this insulated wire was 500 V at room temperature, and 300 V at a temperature of 800° C.

When this insulated wire was wound on the outer peripheral surface of a cylinder of 3 cm in diameter, no crack was caused in the insulating layer.

EXAMPLE 2

(a) Formation of Chromium Oxide Containing Layer

A copper wire clad with stainless steel (SUS304) was produced to have a wire diameter of 1.8 mm. The stainless steel layer has a thickness of 200 μm. This copper wire, clad with stainless steel, was used as a base material, so that its surface was chrome-plated with an electrolyte containing 200 g/l of chromic anhydride and 20 g/l of acetic acid. As to plating conditions, the base material was used as a cathode at a bath temperature of 50° C., with a current density of 150 $A/dm^2$ and a treatment time of 2 minutes.

Through such chrome plating, a chromium oxide containing layer was formed on the surface of the copper wire, clad with stainless steel, with a thickness of about 1 μm.

(b) Preparation of Coating Solution

Tris(N-methylamino)methylsilane was heated in an autoclave at 500° C. for 3 hours, to prepare polysilazane. 10 g of the polysilazane was diluted with 100 ml of tetrahydrofuran, naturally cooled at room temperature, and thereafter mixed with 3 g of aluminum nitride particles of 1.5 μm in nominal particle diameter, to prepare a coating solution.

(c) Coating

The wire obtained in the above process (a) was dipped in the coating solution prepared in the process (b). The coated wire was heated at 500° C. for 10 minutes. The steps of dipping the wire in the coating solution and heating the same were repeated 10 times.

Figure 2:
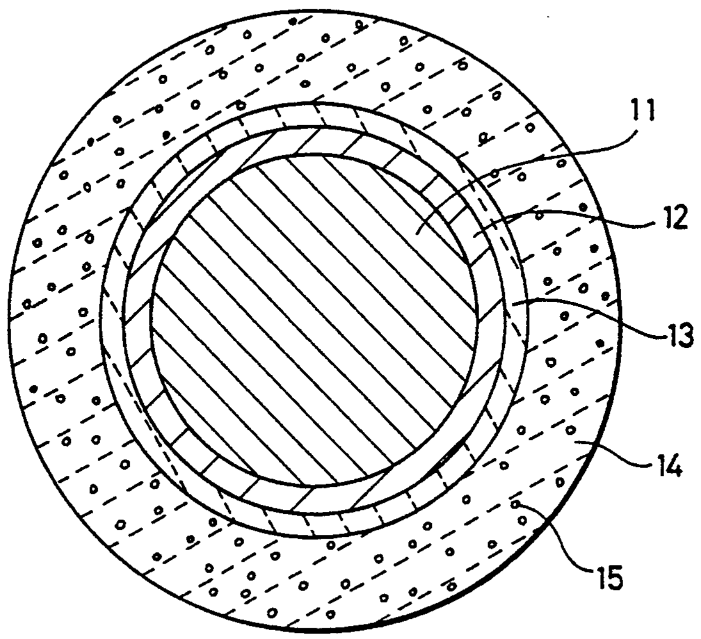
FIG. 2 is a sectional view showing Example 2 of the present invention.

Thus, a chromium oxide containing layer was coated with an organic metal polymer, and thermally decomposed to form a nitride insulating layer. FIG. 2 shows this insulated wire. Referring to FIG. 2, a stainless steel layer 12 is formed on the outer surface of a copper wire 11 as a clad layer. A chromium oxide containing layer 13 is formed on the stainless steel layer 12. A nitride insulating layer 14 is formed on the chromium oxide containing layer 13. Aluminum nitride particles 15, for example, are dispersed in the nitride insulating layer 14.

In this Example 2, a combined layer defined by the chromium oxide containing layer 13 and the nitride insulating layer 14 was 12 μm in thickness.

In order to evaluate the insulability of the so produced insulated wire, the breakdown voltage was measured. The breakdown voltage of this wire was 900 V at the room temperature, and 700 V at a temperature of 800° C. When this insulated wire was wound on the outer peripheral surface of a cylinder of 15 cm in diameter, no crack was caused in the insulating layer.

EXAMPLE 3

Electrolytic plating was performed on the surface of a nickel-plated copper wire in a similar manner to Example 1, to form a wire having a diameter of 0.5 mm coated with a chromium oxide containing layer on its surface. In this wire, the chromium oxide containing layer had a thickness of 1.0 μm.

Then, a solution for forming a metal oxide insulating layer was prepared by a sol-gel method. Nitric acid was added to a solution, containing tetrabutyl orthosilicate, water and isobutyl alcohol in mol ratios of 8:32:60, at a rate of 3/100 mol. This mixture was heated at a temperature of 80° C. for 2 hours, to prepare a coating solution. This solution was applied onto the aforementioned wire having a chromium oxide containing layer on its surface and heated in normal the atmosphere at 600° C. for 15 minutes, to form a metal oxide insulating layer having a thickness of 4 μm.

The breakdown voltage of this wire having a metal oxide insulating layer on its surface was 400 V, and it was impossible to wind this wire on a cylinder having a diameter of less than 40 mm.

Polysilazane was prepared in a similar manner to Example 1, to form a nitride insulating layer 7 μm thick on the surface of the wire having a metal oxide insulating layer. In this case, the wire exhibited a breakdown voltage of 1400 V, and it was possible to bend the same around a diameter of 20 mm.

EXAMPLE 4

Another wire was produced to have a nitride insulating layer 2 μm thick. This wire exhibited a breakdown voltage of 600 V, and it was possible to bend the same around a cylinder having a diameter of 5 mm.

Figure 3:
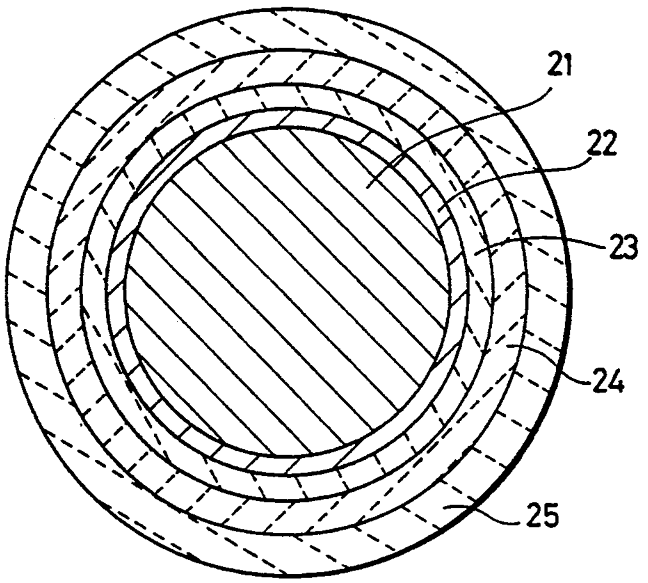
FIG. 3 is a sectional view showing Example 3 of the present invention.

FIG. 3 is a sectional view showing a wire of this Example having a chromium oxide containing layer, a metal oxide insulating layer provided thereon and a nitride insulating layer formed thereon. Referring to FIG. 3, a nickel-plated layer 22 is coated onto a copper wire 21, and a chromium oxide containing layer 23 is provided around the nickel-plated layer 22. A metal oxide insulating layer 24 is provided around the chromium oxide containing layer 23, and a nitride insulating layer 25 is provided around the metal oxide insulating layer 24.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A flexible and high temperature resistant electrically insulated wire for prevention of cracking when wound upon a cylinder, comprising an electrically conducting base material selected from the group consisting of copper and copper alloy having an outer surface end forming an electrical conductor; a chromium oxide containing layer having a thickness of at least 1 μm formed on said outer surface of said electrical conductor; and an electrically insulating nitride layer selected from the group consisting of silicon nitride and aluminum nitride having a thickness of at least 2 μm obtained by thermal decomposition of an organic metal polymer at a temperature within a range of 500° C. to 700° C., said electrically insulating nitride layer being formed on said chromium oxide containing layer, said electrically insulating nitride layer and said chromium oxide containing layer together having a thickness of not more than 12 μm.

2. The electrically insulated wire of claim 1, further comprising a metal oxide insulating layer formed by a sol-gel method, between said chromium oxide containing layer and said electrically insulating nitride layer.

3. The electrically insulated wire of claim 1, wherein said organic metal polymer is alkyl aminosilicate.

4. The electrically insulated wire of claim 1, wherein said chromium oxide containing layer is formed by electrolytic plating.

5. The electrically insulated wire of claim 1, wherein said electrically insulating nitride layer comprises fine particles of ceramics dispersed in said electrically insulating nitride layer.

6. The electrically insulated wire of claim 1, wherein said copper or copper alloy conductor comprises on said outer surface a layer of a member selected from the group consisting of nickel, chromium and stainless steel, said layer having been formed by one of plating and cladding.

7. A flexible and high temperature resistant electrically insulated wire for prevention of cracking when wound upon a cylinder, consisting of a wire core forming an electrical conductor made of a member selected from the group consisting of copper and copper alloy, a chromium oxide containing layer formed on an outer surface of said wire core, and an electrically insulating nitride layer selected from the group consisting of silicon nitride and aluminum nitride on said chromium oxide containing layer.

* * * * *

UNITED STATES PATENT AND TRADEMARK OFFICE
CERTIFICATE OF CORRECTION

PATENT NO. : 5,350,638

DATED : September 27, 1994

INVENTOR(S) : Kazuo Sawada; Shinji Inazawa; Kouichi Yamada

It is certified that error appears in the above-identified patent and that said Letters Patent is hereby corrected as shown below: Title page, item [56] References Cited replace "56-08167" by --56-081670--.

Col. 5, line 9, replace "has" by --had--.

Claim 1, col. 6, line 45, replace "end" by --and--.

Signed and Sealed this

Third Day of January, 1995

Attest:

BRUCE LEHMAN

*Attesting Officer* *Commissioner of Patents and Trademarks*